(12) United States Patent
Kube et al.

(10) Patent No.: US 7,472,490 B2
(45) Date of Patent: Jan. 6, 2009

(54) SHAPE-MEASURING ASSEMBLY FOR A GRINDING MACHINE

(75) Inventors: Samuel C. Kube, Templeton, PA (US); Albert A. Plekker, Butler, PA (US)

(73) Assignee: HCC/KPM LLC, Ford City, PA (US)

( * ) Notice: Subject to any disclaimer, the term of this patent is extended or adjusted under 35 U.S.C. 154(b) by 0 days.

(21) Appl. No.: 11/814,846

(22) PCT Filed: Mar. 2, 2006

(86) PCT No.: PCT/US2006/003742

§ 371 (c)(1),
(2), (4) Date: Mar. 5, 2008

(87) PCT Pub. No.: WO2006/084072

PCT Pub. Date: Aug. 10, 2006

(65) Prior Publication Data

US 2008/0163509 A1 Jul. 10, 2008

Related U.S. Application Data

(60) Provisional application No. 60/649,953, filed on Feb. 4, 2005.

(51) Int. Cl.
*G01B 5/20* (2006.01)
(52) U.S. Cl. .................................... 33/555.1; 33/551
(58) Field of Classification Search ........ 33/550–555.1, 33/501.02
See application file for complete search history.

(56) References Cited

U.S. PATENT DOCUMENTS

| 4,437,239 | A | 3/1984 | Possati |
| 4,524,546 | A | 6/1985 | Hoover et al. |
| 4,811,524 | A | 3/1989 | Corallo |
| 4,903,413 | A | 2/1990 | Bellwood |
| 5,337,485 | A | 8/1994 | Chien |
| 5,551,906 | A | 9/1996 | Helgren |
| 6,159,074 | A | 12/2000 | Kube et al. |
| 6,568,096 | B1 | 5/2003 | Svitkin et al. |
| 6,835,115 | B2 | 12/2004 | Syrjanen |

FOREIGN PATENT DOCUMENTS

GB 2197477 A 5/1988

*Primary Examiner*—G. Bradley Bennett
*Assistant Examiner*—Amy Cohen Johnson
(74) *Attorney, Agent, or Firm*—The Webb Law Firm

(57) ABSTRACT

A linked transport mechanism and method that uses a single source of motive force to synchronously position multiple displaceable sensors of a shape-measuring assembly onto a roll received in a roll grinding machine. At least two sensors (28, 29) are mounted on linear slides on at least one measuring arm (1). The complete shape-measuring assembly includes at least three sensors (27, 28, 29) or measuring points to allow the calculation of the cross-sectional shape of the roll and the extraneous error movement of the roll. At least one measuring arm is connected to a linear guide (4) of the frame (3). The linear motor is connected between the frame and the measuring arms. The linked transport mechanism assures the synchronous accurate positioning of the sensors, each at a fixed angle through the roll center, over the entire range of roll diameters that the grinding machine may receive.

14 Claims, 6 Drawing Sheets

Fig. 2: Side 2 (Secondary Side)

SHAPE-MEASURING ASSEMBLY FOR A GRINDING MACHINE

BACKGROUND OF THE INVENTION

1. Field of the Invention

This invention relates generally to the field of roll or cylinder grinding machines and, more particularly, to a measuring assembly or caliper assembly utilized to measure the geometry or configuration of rolls or cylinders received on grinding machines.

2. Description of Related Art

Rolling mills in the steel, aluminum and paper industries commonly use metal rolls in shaping products, such as a piece or sheet of metal, aluminum foil, or sheet of paper. The rolls may have a surface cover of a material other than metal, such as rubber, polyurethane or ceramic. Use in the mill eventually leads to a degradation of shape and quality of the roll surface, at which point one must take the roll out of the mill for refinishing on a grinding machine. U.S. Pat. No. 4,811,524 to Corallo describes a grinding machine.

U.S. Pat. No. 6,159,074 to Kube et al. describes a caliper assembly for a grinding machine. This caliper has two measuring arms used to measure the diameter of the roll in the grinding machine. A series of consecutive diameter measurements along the length of the roll provides the roll profile.

A common problem with roll grinding stems from inaccuracies in the mechanical support of the roll which induce extraneous error movements of the roll as the roll turns. Without compensation in the grinding process, these error movements may contribute to roundness or shape errors in the finished roll.

A two-point measurement cannot reliably distinguish roundness or shape errors from error movements of the roll.

SUMMARY OF THE INVENTION

Briefly, according to the present invention, there is provided a shape-measuring assembly for a roll grinding machine capable of supporting a workpiece roll in at least two spaced bearings defining the axis of the roll. The assembly is configured for measuring the shape of the generally cylindrical surface of the roll mounted in the bearings. The measuring assembly comprises a movable support frame spaced from the roll axis and movable parallel to the roll axis over a reference plane, such as the floor, parallel to the roll axis. An arm carriage is supported within the support frame for movement toward and away from the reference plane. A first arm is supported from the arm carriage extending away from the frame. The first arm extends over the roll axis. A fixed sensor probe is mounted near the distal end of the first arm for sensing the position of the surface of the roll. A first rail is mounted in the first arm, forming a first angle with the reference plane. A first positionable sensor carriage is mounted to be guided along the first rail. A first sensor probe is mounted to the first sensor carriage for sensing the position of the surface of the roll. The first sensor carriage and the first arm carriage are interconnected such that as the first arm is moved by the arm carriage toward the roll axis, the first sensor carriage is moved in a first path toward the roll axis.

Preferably, a second rail is mounted in the first arm, forming a second and different angle with the reference plane. A second positionable sensor carriage is mounted to be guided along the second rail. A second sensor probe is mounted to the second sensor carriage for sensing the position of the surface of the roll and the arm. The second sensor carriage and the arm carriage are interconnected such that as the arm is moved by the arm carriage toward the roll axis, the second sensor carriage is moved in a second path toward the roll axis.

Most preferably, the first and second sensor carriages have different ranges of travel relative to the surface of the roll.

It is an advantage, according to the present invention, that the first fixed, first positionable and second positionable sensor probes can determine the position of three points on the surface of the roll, thus defining a circle on the surface of the roll including the location of the center of the circle and the diameter of the circle.

According to a preferred embodiment, a second arm is supported from a second arm carriage extending away from the frame. The second arm extends under the roll axis. A second fixed sensor probe is mounted near the distal end of the second arm for sensing the position of the surface of the roll. It is an advantage of this embodiment that at least three of the first fixed, second fixed, first positionable and second positionable sensor probes can determine the position of at least three points on the surface of the roll, thus defining a circle on the surface of the roll including the location of the center of the circle and the diameter of the circle.

According to one embodiment, the sensor carriage and the arm carriage are interconnected by a gear rack fixed to the frame and a pinion engaging the gear rack carried by an axle journaled relative to the arm and arm carriage. A reduction gear and driving sprocket secured to an axle are arranged for driving a chain or grooved belt over the sprocket and a spaced idler sprocket. The chain or grooved belt is connected to the sensor carriage.

It is most preferred, according to the present invention, that the sensor carriage and the arm carriage are interconnected so that the carriages move toward the roll along a radial path extending from the roll axis. In one embodiment, gears and sprockets are sized so that a unit movement of the first arm downward toward the roll results in a movement of the sensor carriage along the rail which is approximately the unit movement divided by the sine of the angle the track makes with the reference plane.

Preferably, sensor probes have a probe bearing fixed to a pivot arm pivoted to a sensor carriage and a length gauge bears on the side of the pivot arm opposite the probe bearing. The length gauge is generally in line with a radial line extending from the roll axis.

DESCRIPTION OF THE PREFERRED EMBODIMENTS

Figure 1:
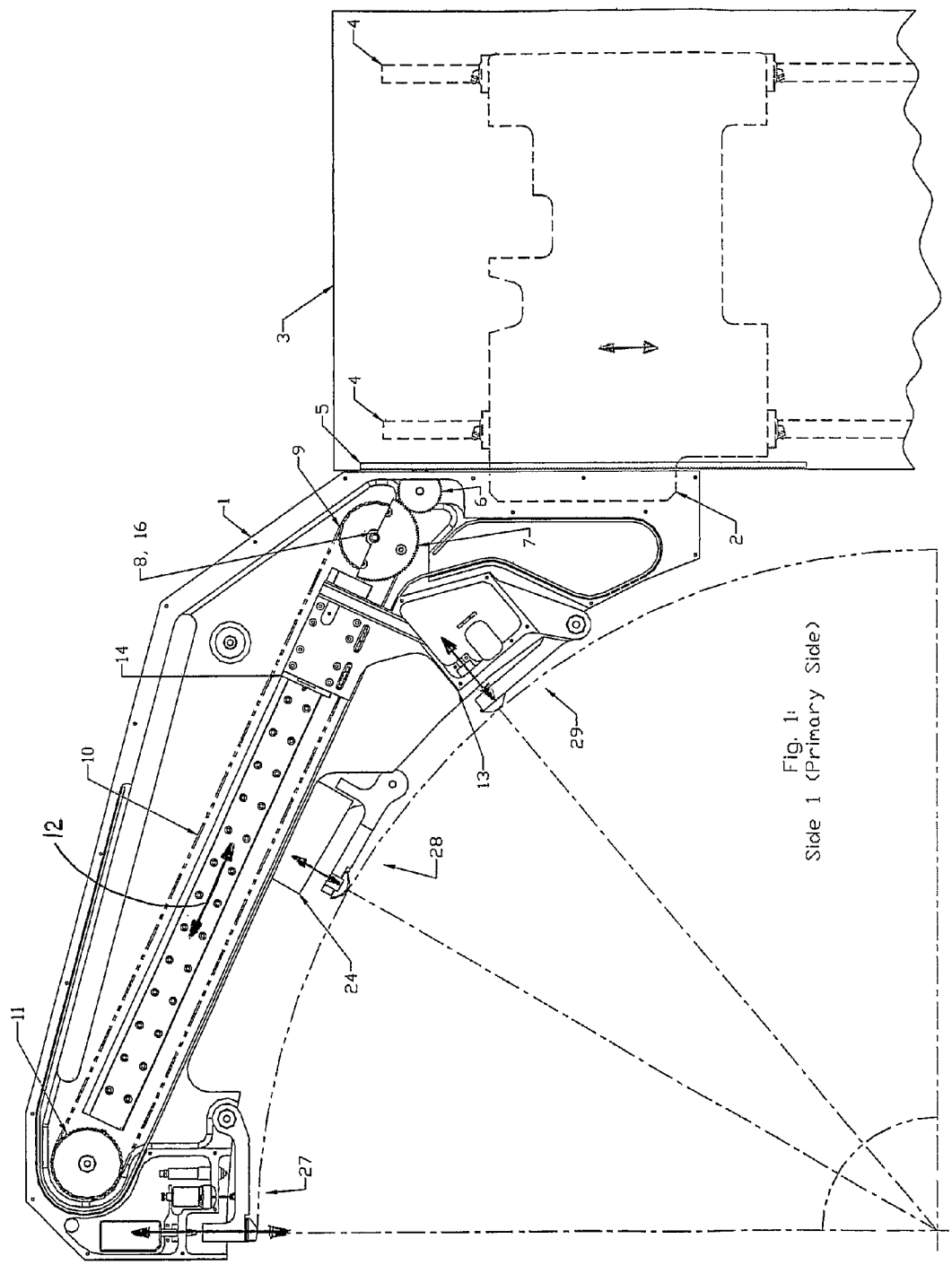
FIG. 1 is a side view showing Side 1 ("primary side") of the shape-correcting arm with multiple probes and synchronous transport mechanism in accordance with the present invention.

The present invention comprises a shape-measuring assembly for a grinding machine for grinding a roll. The grinding machine includes a support to receive the roll so that the roll can turn around its longitudinal axis and a grinding wheel that can grind the surface around the circumference of the roll. An infeed mechanism brings the grinding wheel in contact with the roll and a traverse mechanism moves the grinding wheel parallel to the longitudinal axis between opposite ends of the roll.

A shape-measuring assembly or caliper assembly is configured to measure the shape of the roll and has mechanisms to place it in contact with the roll surface and to move it between opposite ends of the roll. The assembly includes a frame and a carriage supported by a linear guide connected to the frame. One or two measuring arms are connected to the linear guide in spaced relation. The linear guide is configured to enable each measuring arm to move relative to the frame and parallel to the longitudinal axis of the linear guide. A linear motor is connected between the frame and the pair of measuring arms. The linear motor is configured to supply to the pair of measuring arms a motive force which moves the pair of measuring arms parallel to the longitudinal axis of the linear guide.

One of the measuring arms incorporates a single displaceable sensor. The second measuring arm incorporates three displaceable sensors, one of which is diametrically opposed to the sensor in the first arm so as to allow a direct diameter measurement of the roll when both arms are brought into contact with the roll. The remaining two sensors are mounted at different angles on linear slides or carriages fixed to the measuring arm. The sensors on the slides are linked to the caliper frame in such a way that when the measuring arms move relative to the frame, the sensors move relative to the measuring arms while retaining their angular orientation. As the arms move in toward the roll, all sensors move along straight lines which intersect at the center of the roll. The three sensors on the one arm provide the minimum measurement data required to calculate the cross-sectional shape of the roll and the error movement of the roll. For better accuracy, one may use the data from four displaceable sensors in the calculation of roll shape and error movement. One may also use only the arm with the three sensors for, in addition to the calculation of roll shape and movement, a calculation of the diameter of the roll. The present invention, therefore, also applies to an assembly configured with a single measuring arm with at least three displaceable sensors or measuring point contacts.

The present invention may include an automatic control system that processes the data from the multiple sensors and calculates the shape of the roll and the error movement of the roll. This is possible since three points on the circumference of a circle enable determination of the position of the center of the circle and, thus, the radius. The control system can superimpose a correction onto the infeed movement of the grinding wheel so as to reduce or eliminate the roundness or shape error that would result from the error movement of the roll in the grinding machine. The control system can use the same correction process to grind the roll to a predetermined out-of-round shape, such as shapes that counteract or compensate for anticipated dynamic deformation of the roll during its subsequent use at mill temperatures and operating speeds.

The present invention makes it possible to measure the error movement of the roll as it turns in the grinding machine. Furthermore, the position and orientation of the measuring assembly make it possible to perform the measurements not only before and after grinding but also during grinding. An automatic control system can then apply shape corrections during the grinding process to compensate for the error movement of the roll and grind the roll round even though it may not turn round in the grinding machine.

Figure 2:
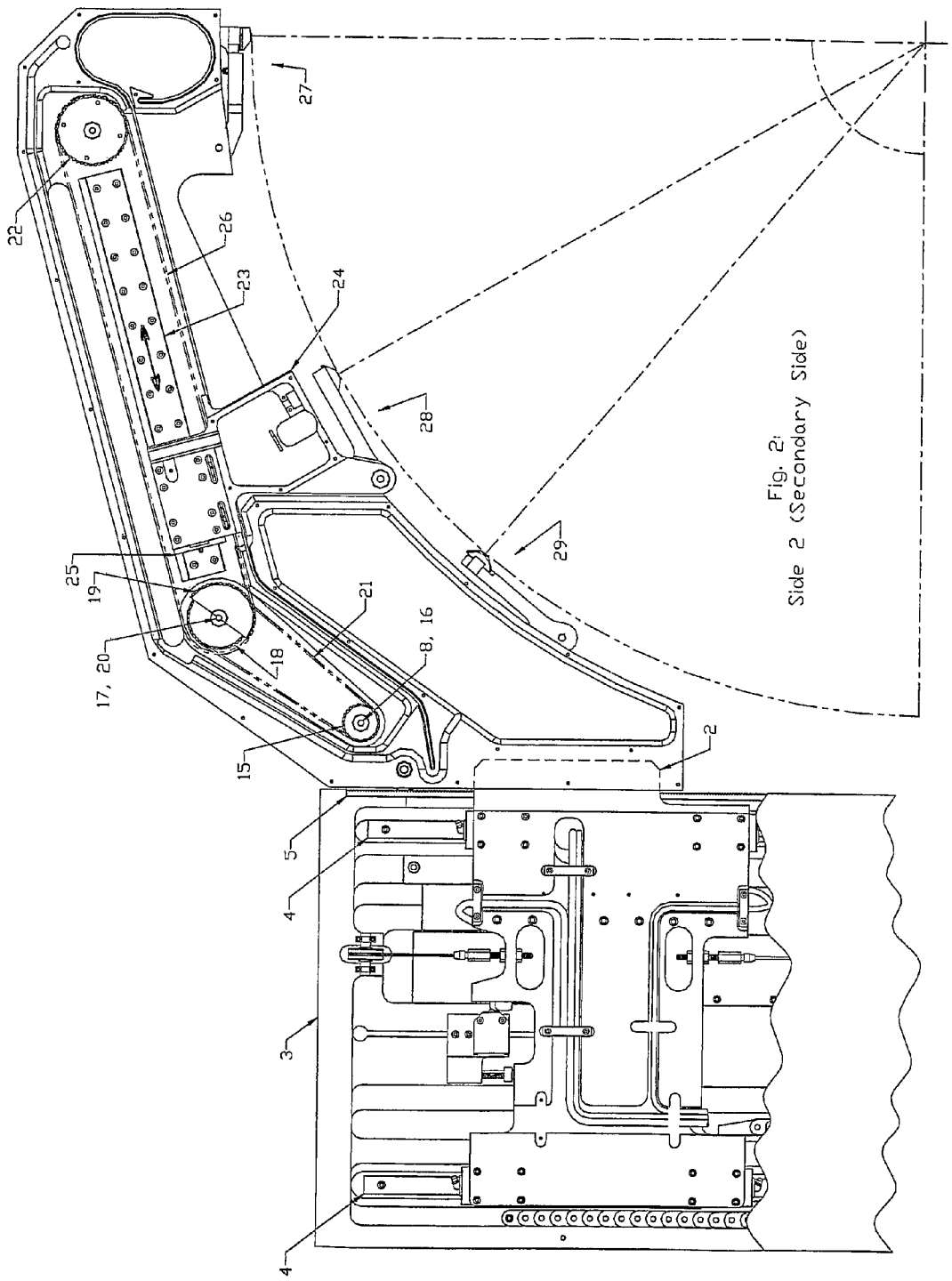
FIG. 2 is a side view showing Side 2 ("secondary side") of the shape-correcting arm with multiple probes and synchronous transport mechanism in accordance with the present invention.

With reference to FIGS. 1 and 2, the preferred embodiment of the shape-measuring or caliper assembly for a grinding machine includes one measuring arm with multiple displaceable probes and a synchronous transport mechanism. A measuring arm body 1 is connected to a mounting base or carriage 2 which is itself movably coupled to a caliper support frame 3 via an elongated linear guide 4. A gear rack 5 is fixedly attached to the front face of the caliper support frame 3. A primary drive pinion 6, rotatably attached to Side 1 (FIG. 1) of the arm body 1, engages the gear rack 5.

The primary drive pinion 6 also meshes with a primary reduction gear 7, which rotates about the primary drive axis 8. A primary transport sprocket 9 is coaxially and fixedly coupled to the primary reduction gear 7 and rotates in unison with the primary reduction gear 7 about the primary drive axis 8. A non-continuous, primary transport toothed belt 10 is wrapped around the primary transport sprocket 9 and a primary idler sprocket 11. The primary idler sprocket 11 is rotatably attached to the arm body 1 on an axis parallel to the primary drive axis 8 and near the far (distal) end of a primary linear guide rail 12. The primary linear guide rail 12 is fixedly attached to the arm body 1 and centrally located between the primary transport sprocket 9 and the primary idler sprocket 11, its axial centerline being parallel to or coplanar with a plane intersecting the primary drive axis 8 and the axis of the primary idler sprocket 11. A tertiary probe body 13 is fixedly attached to a primary linear bearing 14 which is itself movably coupled to the primary linear guide rail 12. Both ends of the primary transport toothed belt 10 are attached to the tertiary probe body 13 by means of screw clamps.

On Side 2 (FIG. 2) of the arm body 1, a secondary drive sprocket 15 is coaxially and rotatably coupled to the opposite end of a common drive axle 16 and rotates in unison with the primary reduction gear 7 and the primary transport sprocket 9. A secondary drive axle 17 is fixedly attached to the arm body 1 at a set distance from and parallel to the common drive axle 16. A secondary reduction sprocket 18 and a secondary transport sprocket 19 are coaxially and rotatably coupled and fixed to the secondary drive axle 17 so that they rotate in unison about a secondary drive axis 20. A continuous, secondary drive toothed belt 21 wraps around the secondary drive sprocket 15 and the secondary reduction sprocket 18. A secondary idler sprocket 22 is rotatably attached to the arm body 1 on an axis parallel to a secondary linear guide rail 23. The secondary linear guide rail 23 is fixedly attached to the arm body 1 and centrally located between the secondary transport sprocket 19 and the secondary idler sprocket 22, its axial centerline parallel to or coplanar with a plane intersecting the secondary drive axis 20 and the axis of the secondary idler sprocket 22. A non-continuous, secondary transport toothed belt 26 wraps around the secondary transport sprocket 19 and the secondary idler sprocket 22. A secondary probe 28 has a secondary probe body 24 is fixedly attached to a secondary linear bearing 25 which is itself movably coupled to the secondary linear guide rail 23. Both ends of the secondary transport toothed belt 26 are attached to the secondary probe body 24 by means of screw clamps.

The primary, secondary and tertiary probe components are very similar and like components are identified with a common numeral in the drawings.

Figure 3:
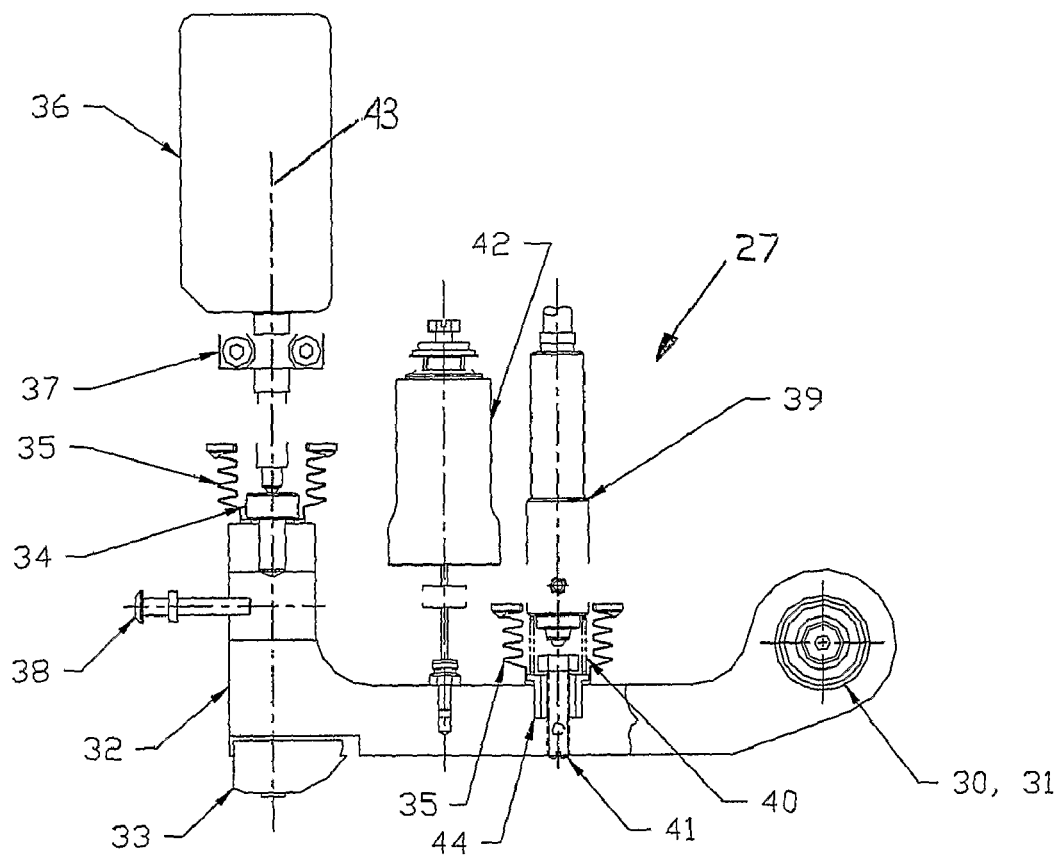
FIG. 3 is a side view of the primary probe cavity and the components housed therein.
Figure 4:
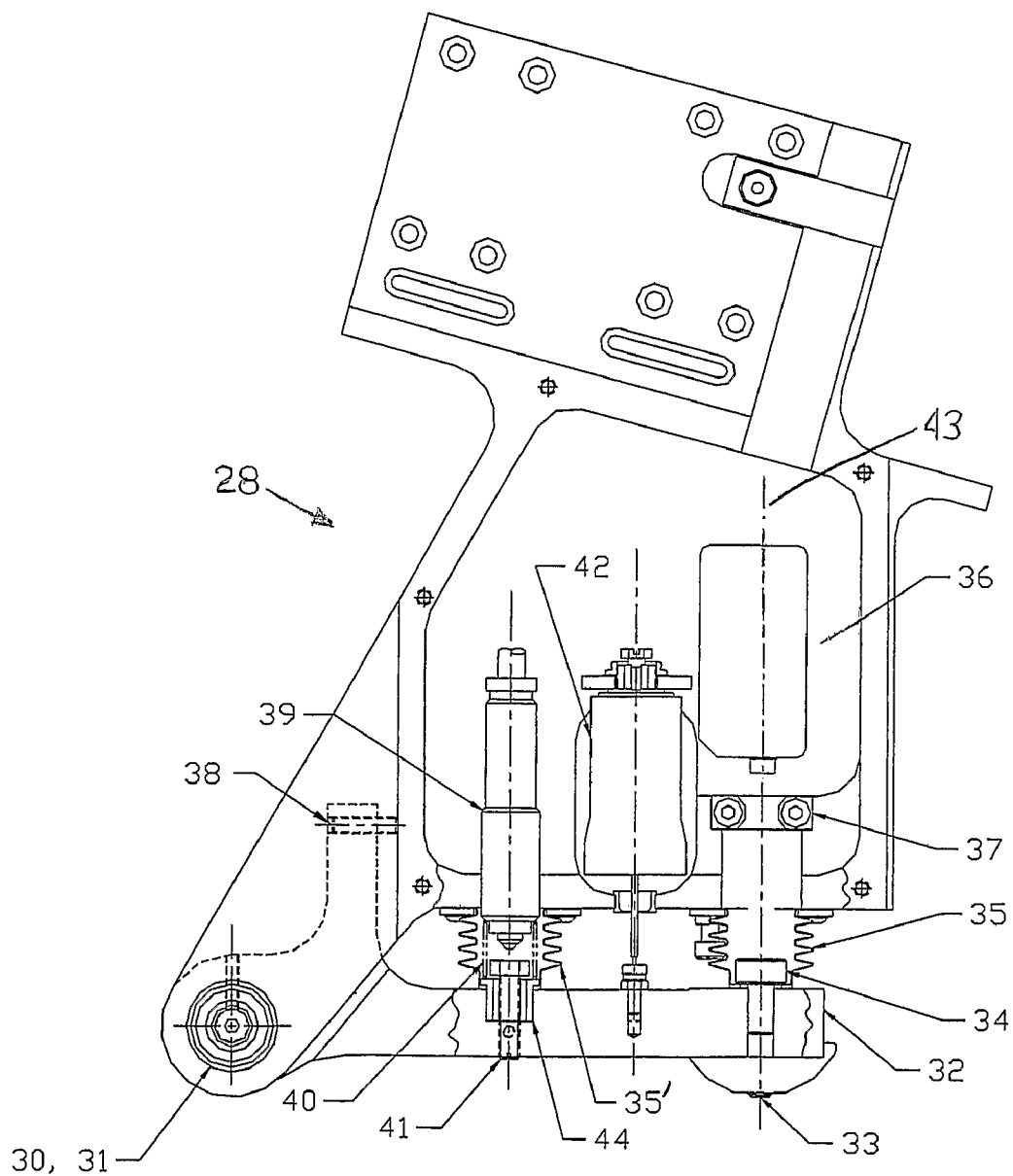
FIG. 4 is a side view of the secondary probe housing and the components housed therein.
Figure 5:
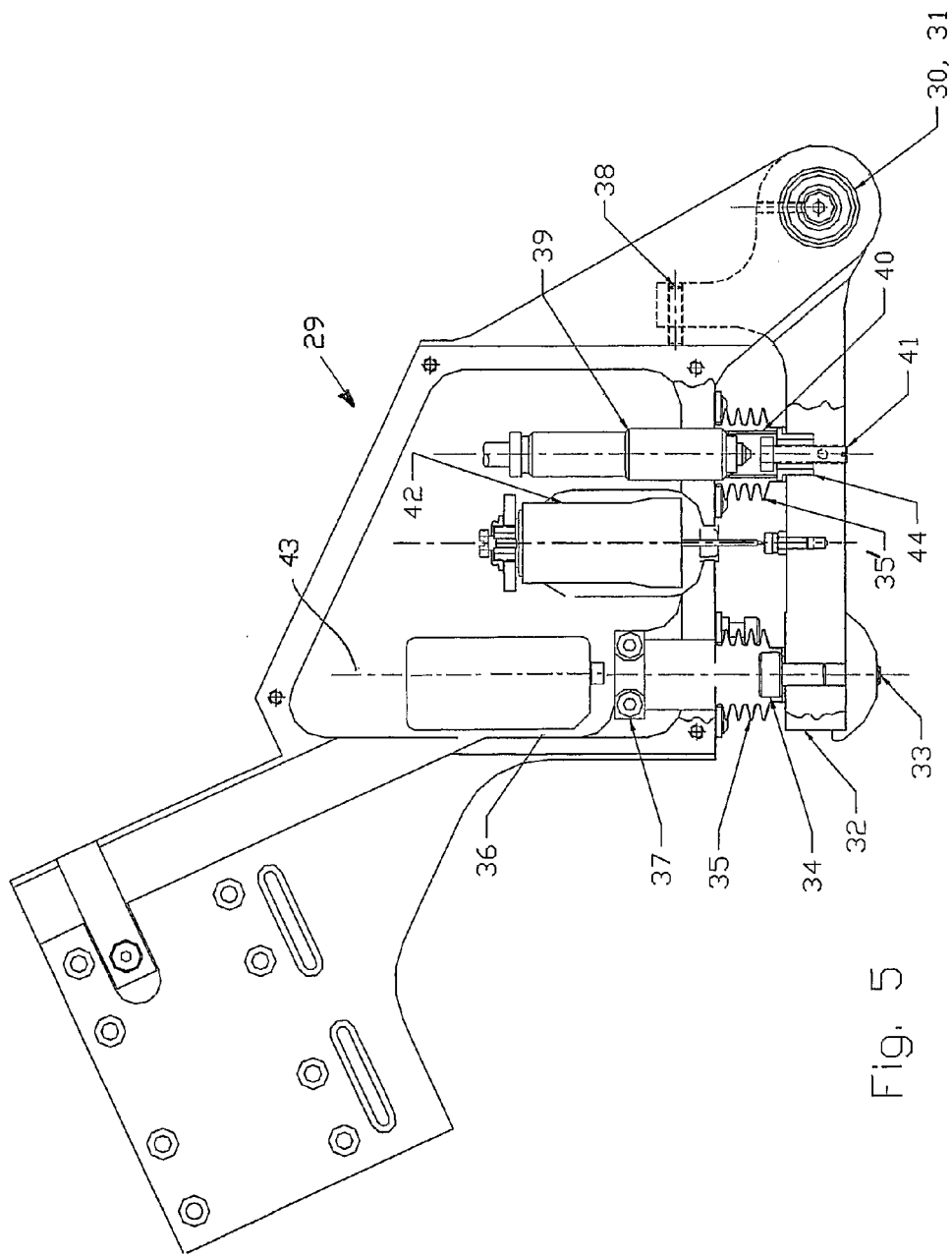
FIG. 5 is a side view of the tertiary probe housing and the components housed therein.

A machined cavity in Side 1 (FIG. 1 and FIG. 3) at the small end of the arm body 1 houses the components comprising the primary displacement probe 27. The main components of the primary (FIG. 3), secondary (FIG. 4) and tertiary (FIG. 5) displacement probes are a probe pivot axle 30 fixedly attached perpendicular to the arm body 1. A probe pivot bearing 31 is rotatably attached to the probe pivot axle 30 and fixedly attached to a probe pivot arm 32, such that the probe pivot arm 32 and the outer bearing race of the probe pivot bearing 31 rotate in unison about the probe pivot axle 30. A probe contact tip 33 is provided at the other end of the probe pivot arm 32 which contacts the outside diameter of a revolving cylindrical workpiece, following its surface contour. The longitudinal axis and centerline of the cylindrical workpiece or rod is fixed in the grinding machine and oriented perpendicular to the caliper's vertical measuring plane (the plane which intersects all of the caliper's probe contact tips 33) and passes through the point on that plane where the caliper's probe centerlines 43 intersect. On the face of the probe pivot arm 32 opposite the probe contact tip 33, a precision-ground rest button 34 is fixedly attached, providing a proof surface for the contact tip of a high-resolution length gauge 36, which registers a motion component directly proportional to the radial displacements produced by the outside diameter surface contour of the cylindrical workpiece as it revolves past the probe contact tip 33, thus lifting or dropping the free end of the probe pivot arm 32, i.e., the end opposite the probe pivot axle 30. The cylindrical barrel of the high-resolution length gauge 36 is adjustably secured inside the probe cavity of the arm body 1 by means of a clamp yoke 37. An adjustable mechanical stop 38 is provided to limit the travel of the free end of the probe pivot arm 32. An adjustable over-travel limit switch 39 is fixed in the probe cavity wall of the arm body 1. A load spring 40 is installed coaxially onto the front of the over-travel limit switch 39, applying a small force moment to the probe pivot arm 32 about the probe pivot axle 30. The over-travel limit switch 39 is tripped when contact pressure from a spring rate adjuster screw 41 displaces the over-travel limit switch 39 plunger sufficiently to trip the contacts inside the switch. The over-travel switch 39 and the mechanical stop 38 prevent excessive travel beyond the rated limits of the high-resolution length gauge 36. To prevent contact point bounce and separation between the rest button 34 and the high-resolution length gauge 36, a motion damper is fixedly mounted between an internal wall inside the primary probe cavity of the arm body 1 and the face of the probe pivot arm 32. A rubber boot seal 35 is fixedly attached by retainer bushing 44 at two locations in each of the three probe configurations—primary (27, FIG. 3), secondary (28, FIG. 4) and tertiary (29, FIG. 5). One end of the first rubber boot seal 35 is fixedly attached to the outside face of the primary probe cavity wall in the arm body 1 and the other end is pinned between the underside of the rest button 34 and the mating face of the probe pivot arm 32. The second rubber boot seal 35' is likewise fixed to the outside face of the primary probe cavity wall in the arm body 1 and the other end is pinned between the underside of the boot seal retainer bushing 44 and the mating face of the probe pivot arm 32. Functionally identical secondary (28, FIG. 4) and tertiary (29, FIG. 5) displacement probe components are likewise housed inside the secondary probe body 24 and the tertiary probe body 13, respectively. A motion damper 42 damps oscillations of the probe pivot arm 32.

Figure 6:
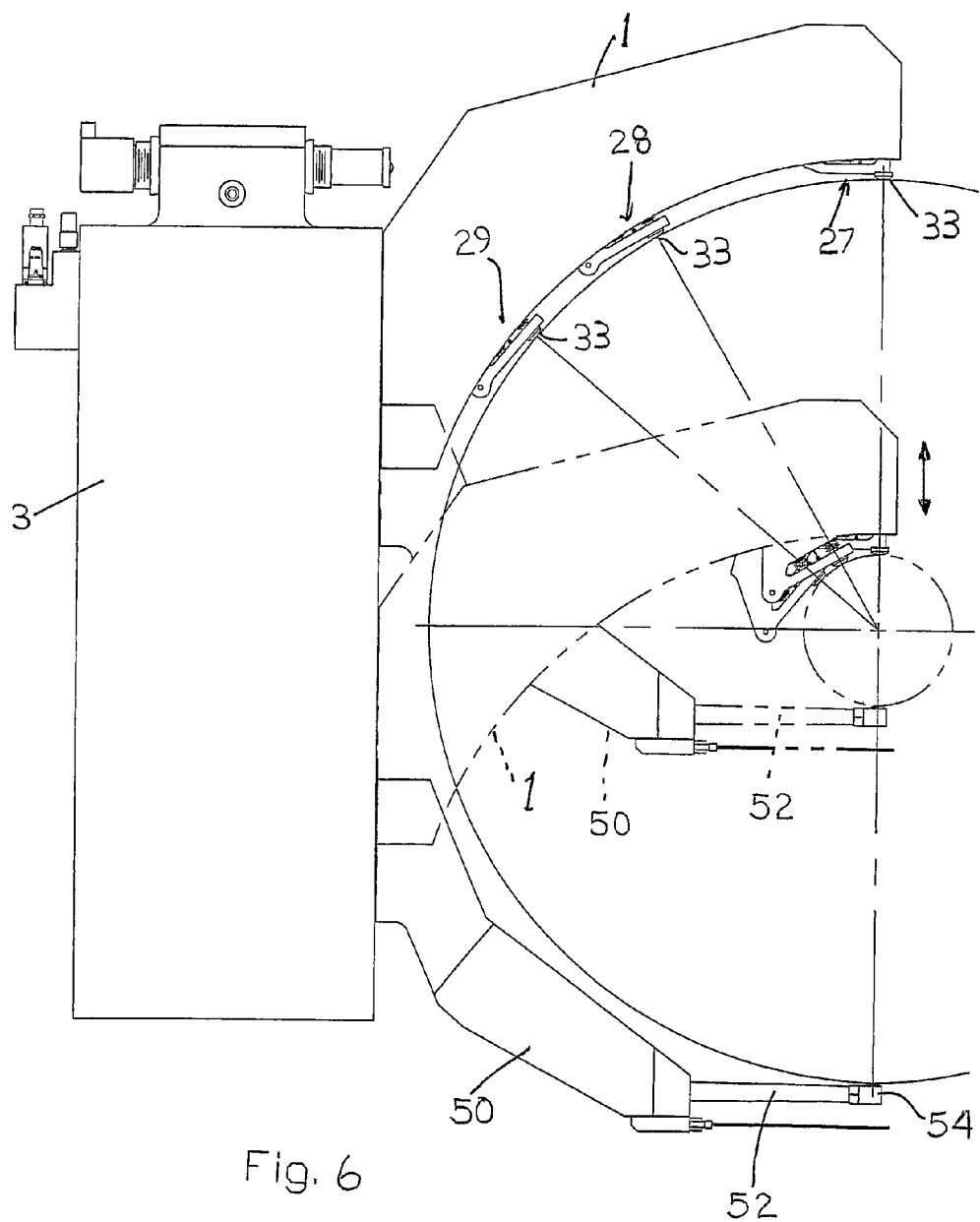
FIG. 6 is a diagram describing the synchronous motion of the displaceable measuring probes accomplished by the transport mechanism included in the present invention.

The preferred embodiment of the present invention as described herein accomplishes the synchronous motion of the three displacement probes so that as the caliper arms approach any cylindrical workpiece within the diametric measurement range, each of the three probes are at all times aligned at fixed and optimum angles with respect to the other two probes (see FIG. 6). As the probe bodies converge to address a workpiece, the contact tips of the probes each travel along a distinct line of action passing through the workpiece center at their optimum and characteristic angles. The synchronous transport mechanism described herein uses only the linear motor housed in the caliper frame as the source of motive power. FIG. 6 also shows another measuring arm 50 including a single displaceable sensor 52. The contact tip 33 in the primary-probe 27 in the arm body 1 including the three displaceable sensors is diametrically opposed to a contact tip 54 in the displaceable sensor 52 in the other measuring arm 50.

Having thus defined the invention in the detail and particularity required by the Patent Laws, what is desired protected by Letters Patent is set forth in the following claims.

The invention claimed is:

1. A shape-measuring assembly for a roll grinding machine capable of supporting a workpiece roll in at least two spaced bearings defining the axis of the roll, said shape-measuring assembly configured for measuring the shape of the generally cylindrical surface of the roll mounted in the bearings, said shape-measuring assembly comprising:

a movable support frame (3) spaced from the roll axis and movable parallel to the roll axis over a reference plane being parallel to the roll axis;

a first arm carriage (2) supported within the support frame and automatically movable toward and away from the reference plane;

a first arm (1) supported from the arm carriage extending away from the frame, said arm extending over the roll axis;

a first fixed sensor probe (27) mounted near the distal end of the first arm for sensing the position of the surface of the roll;

a first rail (12) mounted in the first arm forming a first acute angle with the reference plane;

a first positionable sensor carriage (29) mounted to be guided along the first rail;

a first positional sensor probe mounted to the first sensor carriage for sensing the position of the surface of the roll;

means for interconnecting the first sensor carriage and the arm carriage such that as the arm is moved by the arm carriage toward the roll axis, the first sensor carriage is automatically moved in a first path toward the roll axis;

a second rail (23) mounted in the first arm forming a second acute angle with the reference plane;

a second sensor carriage (28) mounted to be guided along the second rail;

a second sensor probe mounted to the second sensor carriage for sensing the position of the surface of the roll;

means for interconnecting the second sensor carriage and the arm carriage such that as the arm is moved by the arm carriage toward the roll axis, the second sensor carriage is automatically moved in a second path toward the roll axis;

a second arm (50) supported from a second arm carriage extending away from the frame, said second arm extending under the roll axis; and a second fixed sensor probe (54) mounted near the distal end of the second arm for sensing the position of the surface of the roll, whereby the first fixed, second fixed, first positionable and second positionable sensor probes can determine the position of at least three points on the surface of the roll, thus defining a circle on the surface of the roll including the location of the center of the circle and the diameter of the circle.

2. A shape-measuring assembly for a roll grinding machine capable of supporting a workpiece roll in at least two spaced bearings defining the axis of the roll, said assembly configured for measuring the shape of the generally cylindrical surface of the roll mounted in the bearings, said measuring assembly comprising:

a movable support frame (3) spaced from the roll axis and movable parallel to the roll axis over a reference plane being parallel to the roll axis;

an arm carriage (2) supported within the support frame automatically movable toward and away from the reference plane;

a first arm (1) supported from the arm carriage extending away from the frame, said arm extending over the roll axis;

a fixed sensor probe (27) mounted near the distal end of the arm for sensing the position of the surface of the roll;

a first rail (12) mounted in the arm forming a first acute angle with the reference plane;

a first positionable sensor carriage (29) mounted to be guided along the first rail;

a first sensor probe mounted to the first sensor carriage for sensing the position of the surface of the roll;

means for interconnecting the first sensor carriage and the arm carriage such that as the arm is moved by the arm carriage toward the roll axis, the first sensor carriage is moved in a first path toward the roll axis;

a second rail (23) mounted in the arm forming a second acute angle with the reference plane;

a second positionable sensor carriage (28) mounted to be guided along the second rail, a second sensor probe mounted to the second sensor carriage for sensing the position of the surface of the roll and the arm; and means for interconnecting the second sensor carriage and the arm carriage such that as the arm is moved by the arm carriage toward the roll axis, the second sensor carriage is automatically moved in a second path toward the roll axis, whereby the fixed, first positionable and second positionable sensor probes can determine the position of three points on the surface of the roll, thus defining a circle on the surface of the roll including the location of the center of the circle and the diameter of the circle.

3. A shape-measuring assembly for a roll grinding machine supporting a workpiece roll in at least two spaced bearings defining the axis of the roll, said assembly configured for measuring the shape of the generally cylindrical surface of the roll mounted in the bearings, said measuring assembly comprising:

a movable support frame (3) spaced from the roll axis and movable parallel to the roll axis over a reference plane being parallel to the roll axis;

a first arm carriage (2) supported within the support frame automatically movable toward and away from the reference plane;

an arm (1) supported from the arm carriage extending away from the frame, said arm extending over the roll axis;

a sensor probe (27) mounted at the distal end of the arm for sensing the position of the surface of the roll;

a rail (12) mounted in the arm forming an acute angle with the reference plane;

a positionable sensor carriage (29) mounted to be guided along the rail;

a sensor mounted to the positionable sensor carriage for sensing the position of the surface of the roll; and means for interconnecting the sensor carriage and the arm carriage such that as the arm is moved by the arm carriage toward the roll axis, the sensor carriage is automatically moved in a path toward the roll axis.

4. The assembly according to any one of claims 1 to 3, wherein the means for interconnecting the sensor carriage and the arm carriage comprises a gear rack (5) fixed to the frame (3) and a pinion (6) engaging the gear rack carried by an axle (8) journaled relative to the arm and arm carriage, there being a reduction gear (7) and driving sprocket (9) secured to an axle (8) for driving a chain or grooved belt (10) over the sprocket and a spaced idler sprocket (11), said chain or grooved belt being connected to said sensor carriage (29).

5. The assembly according to any one of claims 1 to 3, wherein the means for interconnecting the sensor carriage and the arm carriage comprises a gear rack (5) fixed to the frame (3) and a pinion (6) engaging the gear rack carried by an axle journaled relative to the arm and arm carriage, there being a reduction gear (7) and driving sprocket (15) secured to the axle (8) for driving a chain or grooved belt (21) over the sprocket and a spaced idler sprocket (18) journaled on a second axle (17), there being a second driving sprocket fixed on said second axle for driving a second chain or grooved belt (26) over a second idler sprocket, said second chain or grooved belt being connected to said sensor carriage (28).

6. The assembly according to any one of claims 1 to 3, wherein the means for interconnecting the sensor carriage and the arm carriage are interconnected so that a unit movement of the first arm downward toward the roll results in a movement of the sensor carriage along the rail which is the unit movement divided by the sine of the acute angle.

7. The assembly according to any one of claims 1 to 3, wherein sensor probes have a probe bearing (33) fixed to a pivot arm (32) pivoted to a sensor carriage and there being a length gauge (36) bearing on the side of the pivot arm opposite the probe bearing, the length gauge being substantially in line with a radial line extending from the roll axis.

8. The assembly according to claim 7, wherein the pivot arm is biased by load spring (40) in the direction of the roll axis.

9. The assembly according to claim 7, wherein the pivot arm is secured by a motion damper (42).

10. The assembly according to claim 1 or 2, wherein the first and second sensor carriages have different ranges of travel relative to the surface of the roll.

11. The assembly according to any one of claims 1 to 3, wherein the first carriage arm is movable perpendicular to the roll axis.

12. The assembly according to any one of claims 1 to 3, wherein the first arm extends generally in a plane perpendicular to the reference plane and the roll axis.

13. The assembly according to claim 1 or 2, wherein the first and second positionable carriages move in a radial path toward the roll axis.

14. The assembly according to claim 3, wherein the positionable carriage moves in a radial path toward the roll axis.

* * * * *